United States Patent
Suryanarayana et al.

(10) Patent No.: US 11,068,035 B2
(45) Date of Patent: Jul. 20, 2021

(54) DYNAMIC SECURE ACPI POWER RESOURCE ENUMERATION OBJECTS FOR EMBEDDED DEVICES

(71) Applicant: Dell Products L.P., Round Rock, TX (US)

(72) Inventors: Shekar Babu Suryanarayana, Bangalore (IN); Sumanth Vidyadhara, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 153 days.

(21) Appl. No.: 16/568,736

(22) Filed: Sep. 12, 2019

(65) Prior Publication Data

US 2021/0081012 A1  Mar. 18, 2021

(51) Int. Cl.
| | |
|---|---|
| *G06F 1/00* | (2006.01) |
| *G06F 1/26* | (2006.01) |
| *G06F 9/451* | (2018.01) |
| *G06F 9/4401* | (2018.01) |
| *G06F 1/3203* | (2019.01) |

(52) U.S. Cl.
CPC .............. *G06F 1/26* (2013.01); *G06F 9/4406* (2013.01); *G06F 9/451* (2018.02); *G06F 1/3203* (2013.01)

(58) Field of Classification Search
CPC ........... G06F 1/26; G06F 9/451; G06F 9/4406
USPC .......................................................... 713/300
See application file for complete search history.

(56) References Cited

U.S. PATENT DOCUMENTS

| | | | | |
|---|---|---|---|---|
| 2003/0028812 A1* | 2/2003 | Stultz | .................... | G06F 21/575 726/2 |
| 2004/0243534 A1* | 12/2004 | Culter | .................. | G06F 9/4411 |
| 2005/0055588 A1* | 3/2005 | Nalawadi | ................ | G06F 21/57 713/300 |
| 2005/0081071 A1* | 4/2005 | Huang | ................... | G06F 21/81 713/300 |
| 2006/0010317 A1* | 1/2006 | Lee | ........................ | G06F 21/572 713/2 |
| 2006/0085630 A1* | 4/2006 | Challener | ............. | G06F 21/575 713/2 |
| 2007/0050632 A1* | 3/2007 | Matsuoka | ............... | G06F 21/31 713/182 |
| 2007/0300207 A1* | 12/2007 | Booth | ................... | G06F 21/575 717/126 |
| 2008/0256350 A1* | 10/2008 | Hattori | .................. | G06F 13/409 713/1 |

(Continued)

*Primary Examiner* — Volvick Derose
(74) *Attorney, Agent, or Firm* — Jackson Walker L.L.P.

(57) ABSTRACT

An information handling system may include a processor, a basic input/output system (BIOS) that is coupled to the processor and configured to execute a pre-boot environment prior to initialization of an operating system of the information handling system, an information handling resource coupled to the processor. The information handling system may be configured to: during execution of the pre-boot environment, create an Advanced Configuration and Power Interface (ACPI) power object for the information handling resource; after initialization of the operating system, execute an application that is configured to request access to the ACPI power object; and in response to cryptographic validation of the application, grant the application access to the ACPI power object, wherein granting the access includes allowing the application to cause the information handling resource to power on.

20 Claims, 3 Drawing Sheets

(56) References Cited

U.S. PATENT DOCUMENTS

| | | | |
|---|---|---|---|
| 2010/0169631 A1* | 7/2010 | Yao | G06F 21/575 |
| | | | 713/2 |
| 2011/0083003 A1* | 4/2011 | Jaber | H04L 63/08 |
| | | | 713/2 |
| 2012/0124357 A1* | 5/2012 | Zimmer | G06F 8/61 |
| | | | 713/2 |
| 2012/0239917 A1* | 9/2012 | Springfield | G06F 21/575 |
| | | | 713/2 |
| 2012/0239939 A1* | 9/2012 | Seethaler | G06F 21/62 |
| | | | 713/186 |
| 2013/0007873 A1* | 1/2013 | Prakash | G06F 1/26 |
| | | | 726/18 |
| 2013/0185789 A1* | 7/2013 | Hagiwara | G06F 21/572 |
| | | | 726/18 |
| 2013/0191624 A1* | 7/2013 | Jarmay | G06F 9/4401 |
| | | | 713/2 |
| 2014/0082724 A1* | 3/2014 | Pearson | G06F 1/3234 |
| | | | 726/22 |
| 2015/0172054 A1* | 6/2015 | Prakash | H04L 9/3263 |
| | | | 713/189 |
| 2015/0220411 A1* | 8/2015 | Shivanna | G06F 11/2289 |
| | | | 714/19 |
| 2017/0185782 A1* | 6/2017 | Furuya | G06F 21/575 |
| 2018/0096151 A1* | 4/2018 | Ghetie | G06F 21/575 |

* cited by examiner

DYNAMIC SECURE ACPI POWER RESOURCE ENUMERATION OBJECTS FOR EMBEDDED DEVICES

TECHNICAL FIELD

The present disclosure relates in general to information handling systems, and more particularly to secure control of information handling resources.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

It is a known problem in information handling systems that many application programs are insecure and vulnerable to unwanted access. This is especially troubling in the context of applications that are able to access sensitive devices such as embedded microphones, cameras, webcams, and the like. For example, such an application might be subject to a security vulnerability; alternatively, some other unrelated program might be subject to a vulnerability, thus giving an attacker the ability to download and run a program that accesses such devices.

Once such undesired access has been achieved, an attacker may be able to surreptitiously record video and/or audio of a user of an information handling system. The recorded data may then be transmitted over the Internet, allowing for espionage, blackmail, etc.

Some security measures exist, but they are typically implemented at the level of the operating system. Further, as new vulnerabilities (e.g., 0-day vulnerabilities) continue to be discovered, devices may remain at risk until updates can be deployed.

There have traditionally been no security measures for these risks at the level of the basic input/output system (BIOS). Accordingly, embodiments of this disclosure address these issues by providing a BIOS-level solution that enables access to sensitive devices only to authorized applications. Further, access may be restricted such that the application is forced to notify the user before obtaining access, and access may be available for limited times. In some embodiments, these restrictions may be implemented by preventing such devices even from powering on until the access is authenticated.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with secure control of information handling resources may be reduced or eliminated.

In accordance with embodiments of the present disclosure, an information handling system may include a processor, a basic input/output system (BIOS) that is coupled to the processor and configured to execute a pre-boot environment prior to initialization of an operating system of the information handling system, an information handling resource coupled to the processor. The information handling system may be configured to: during execution of the pre-boot environment, create an Advanced Configuration and Power Interface (ACPI) power object for the information handling resource; after initialization of the operating system, execute an application that is configured to request access to the ACPI power object; and in response to cryptographic validation of the application, grant the application access to the ACPI power object, wherein granting the access includes allowing the application to cause the information handling resource to power on.

In accordance with these and other embodiments of the present disclosure, a method may include: during execution of a pre-boot environment of an information handling system by a basic input/output system (BIOS) of the information handling system, creating an Advanced Configuration and Power Interface (ACPI) power object for an information handling resource of the information handling system; after initialization of an operating system of the information handling system, executing an application that is configured to request access to the ACPI power object; and in response to cryptographic validation of the application, granting the application access to the ACPI power object, wherein granting the access includes allowing the application to cause the information handling resource to power on.

In accordance with these and other embodiments of the present disclosure, an article of manufacture may include a non-transitory, computer-readable medium having computer-executable code thereon that is executable by a processor of an information handling system for: during execution of a pre-boot environment of the information handling system by a basic input/output system (BIOS) of the information handling system, creating an Advanced Configuration and Power Interface (ACPI) power object for an information handling resource of the information handling system; after initialization of an operating system of the information handling system, executing an application that is configured to request access to the ACPI power object; and in response to cryptographic validation of the application, granting the application access to the ACPI power object, wherein granting the access includes allowing the application to cause the information handling resource to power on.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
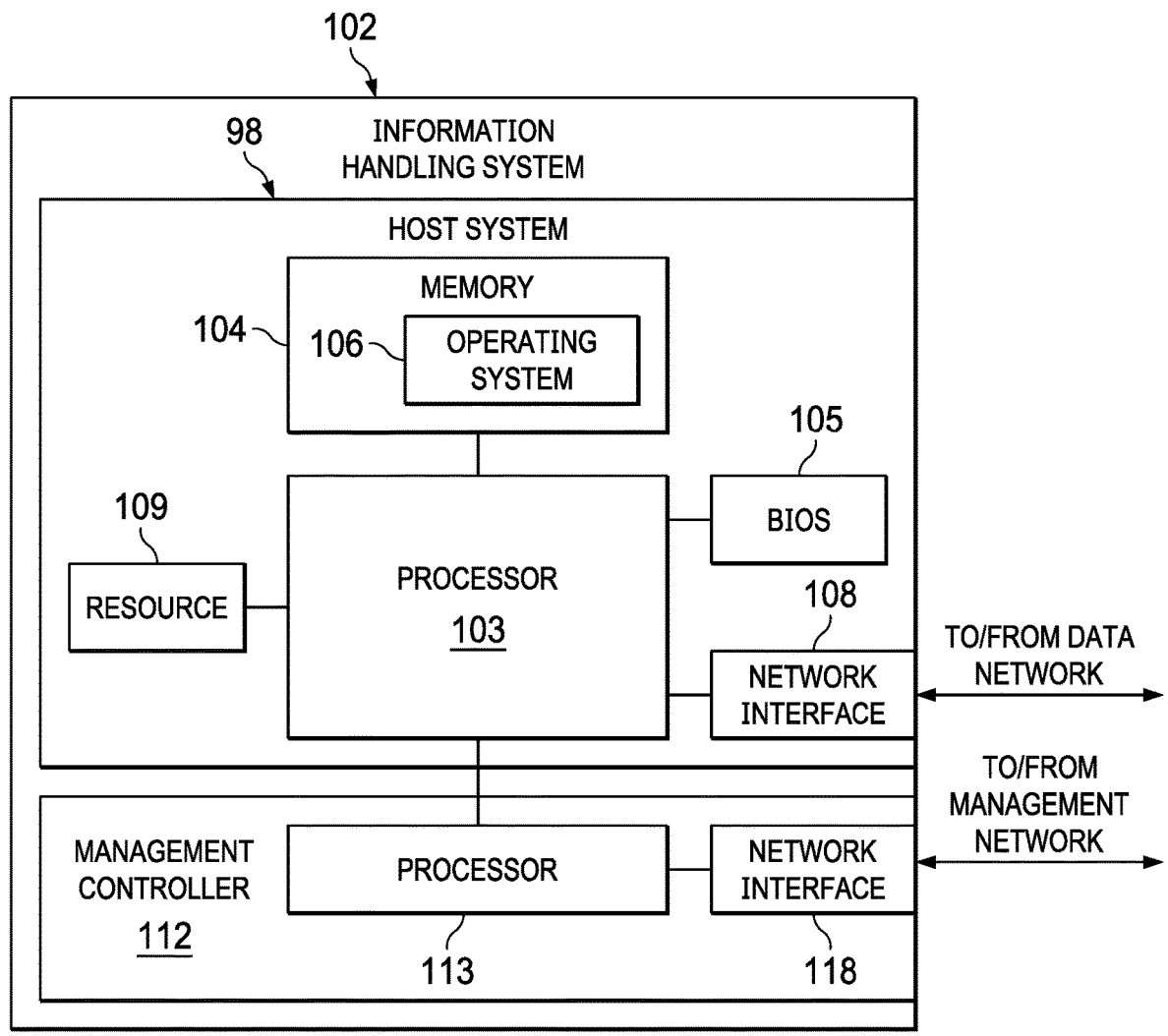
FIG. 1 illustrates a block diagram of an example information handling system, in accordance with embodiments of the present disclosure.

Preferred embodiments and their advantages are best understood by reference to FIGS. 1 through 4, wherein like numbers are used to indicate like and corresponding parts.

For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

For the purposes of this disclosure, the term "management controller" may broadly refer to an information handling system that provides management functionality (typically out-of-band management functionality) to one or more other information handling systems. In some embodiments, a management controller may be (or may be an integral part of) a service processor, a baseboard management controller (BMC), a chassis management controller (CMC), or a remote access controller (e.g., a Dell Remote Access Controller (DRAC) or Integrated Dell Remote Access Controller (iDRAC)).

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data (which may generally be referred to as "physical storage resources"). As shown in FIG. 1, information handling system 102 may comprise a processor 103, a memory 104 communicatively coupled to processor 103, a BIOS 105 (e.g., a UEFI BIOS) communicatively coupled to processor 103, a network interface 108 communicatively coupled to processor 103, and a management controller 112 communicatively coupled to processor 103.

In operation, processor 103, memory 104, BIOS 105, and network interface 108 may comprise at least a portion of a host system 98 of information handling system 102. In addition to the elements explicitly shown and described, information handling system 102 may include one or more other information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions (or aggregation of programs of executable instructions) configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

Management controller 112 may be configured to provide management functionality for the management of information handling system 102. Such management may be made by management controller 112 even if information handling system 102 and/or host system 98 are powered off or powered to a standby state. Management controller 112 may include a processor 113, memory, and a network interface 118 separate from and physically isolated from network interface 108.

As shown in FIG. 1, processor 113 of management controller 112 may be communicatively coupled to processor 103. Such coupling may be via a Universal Serial Bus (USB), System Management Bus (SMBus), and/or one or more other communications channels.

Network interface 118 may be coupled to a management network, which may be separate from and physically isolated from the data network as shown. Network interface 118 of management controller 112 may comprise any suitable system, apparatus, or device operable to serve as an interface between management controller 112 and one or more other information handling systems via an out-of-band management network. Network interface 118 may enable management controller 112 to communicate using any suitable transmission protocol and/or standard. In these and other embodiments, network interface 118 may comprise a network interface card, or "NIC." Network interface 118 may be the same type of device as network interface 108, or in other embodiments it may be a device of a different type.

Host system 98 may also include information handling resource 109. Information handling resource 109 may be coupled to processor 103 (e.g., via a PCI interface, a PCIe interface, a USB interface, or any other suitable communications interface). For example, information handling resource 109 may be a sensitive device, such as an embedded webcam, microphone, camera, etc. In some embodiments, more than one such information handling resource 109 may be present.

As noted above, some embodiments of this disclosure may provide for securely authenticating access to information handling resource 109. In the absence of such authentication, it may be impossible for information handling resource 109 to be powered on.

According to some embodiments, a hierarchical tree structure may be created in OS-controlled memory to contain an ACPI named embedded object for each information handling resource 109. Such an ACPI named embedded object may include various components. For example, it may include a data object for the embedded object, enabling trusted secure methods. It may further include a control method object for managing access. And it may still further include a bus/device/function (BDF) object for implementing the actual power resource node functionality.

In some embodiments, a trusted application running on the operating system of the information handling system may dynamically change the contents of the ACPI namespace at runtime by loading and/or unloading definition blocks from the ACPI tables that may reside in the ACPI BIOS.

Figure 2:
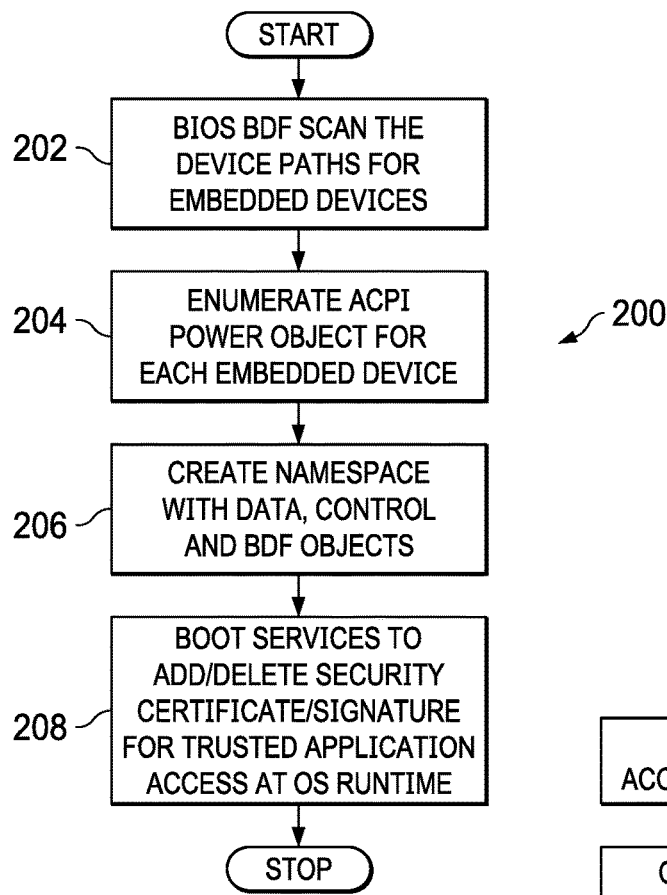
FIG. 2 illustrates an example flow diagram of a method in accordance with embodiments of the present disclosure.

Turning now to FIG. 2, a flow chart is shown of an example method 200 for boot time ACPI power object and namespace creation and association. At step 202, the BIOS may perform a BDF scan of the available device paths for any embedded devices.

At step 204, for each embedded device that was discovered at step 202, an ACPI power object may be enumerated.

At step 206, for each embedded device, an ACPI namespace may be created. This namespace may include data, control, and BDF objects as mentioned above.

At step 208, boot services may add and/or delete security certificates and/or signatures to allow for access by trusted applications at OS runtime.

After the completion of step 208, method 200 may end, and the information handling system may continue with the ordinary boot process.

Figure 3:
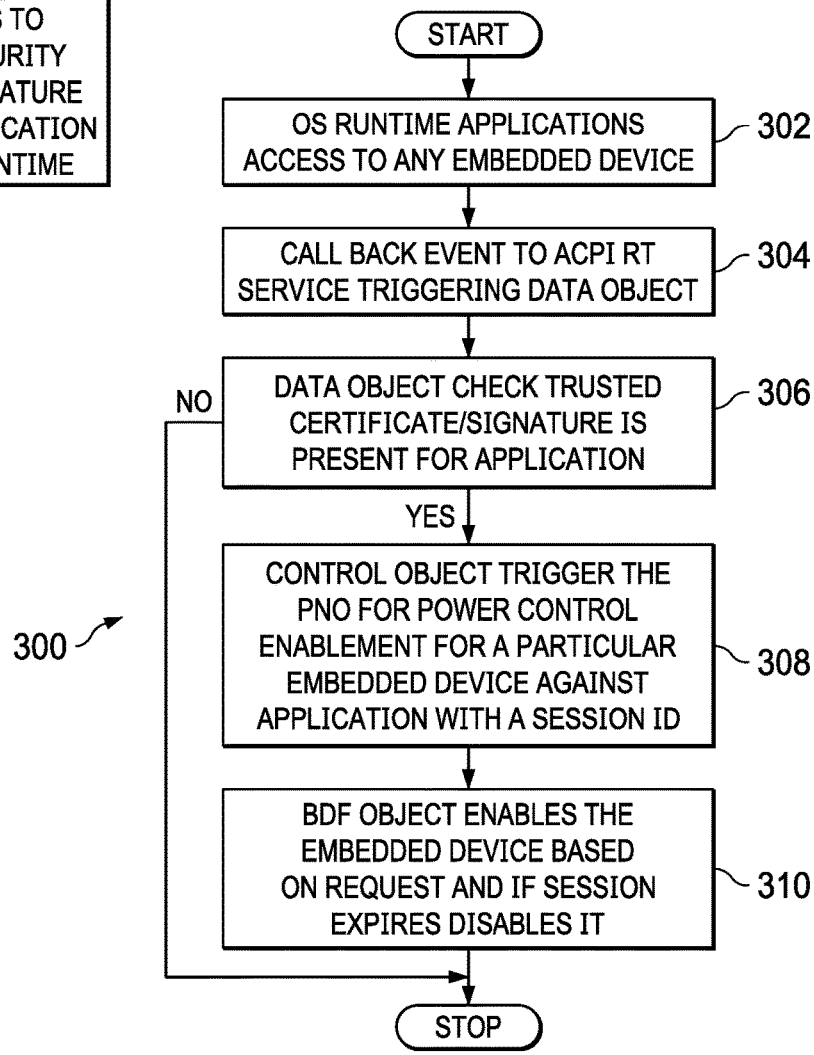
FIG. 3 illustrates an example flow diagram of a method in accordance with embodiments of the present disclosure.

Turning now to FIG. 3, a flow chart is shown of an example method 300 for OS runtime application access, trust verification, and device enabling/disabling.

At step 302, an application may request, during OS runtime, access to an embedded device. At step 304, a callback event to the information handling system's ACPI runtime service may execute, triggering that embedded device's data object.

At step 306, the data object may check to determine whether a trusted certificate and/or signature is present for the requesting application.

If no such trusted certificate and/or signature is present, method 300 ends. If the trusted certificate and/or signature is present, however, method 300 proceeds to step 308.

At step 308, the control object may trigger a _PNO (a power node object, discussed in more detail below) for power control enablement for the embedded device for the requesting application with a particular session ID.

At step 310, the BDF object for the embedded device may enable the embedded device based on the request. If the session established by the application expires, the BDF object may disable the embedded device. After the completion of step 310, method 300 may end.

One of ordinary skill in the art with the benefit of this disclosure will understand that the preferred initialization point for the methods depicted in FIGS. 2-3 and the order of the steps comprising those methods may depend on the implementation chosen. In these and other embodiments, this method may be implemented as hardware, firmware, software, applications, functions, libraries, or other instructions. Further, although FIGS. 2-3 disclose a particular number of steps to be taken with respect to the disclosed methods, the methods may be executed with greater or fewer steps than those depicted. The methods may be implemented using any of the various components disclosed herein (such as the components of FIG. 1), and/or any other system operable to implement the method.

Figure 4:
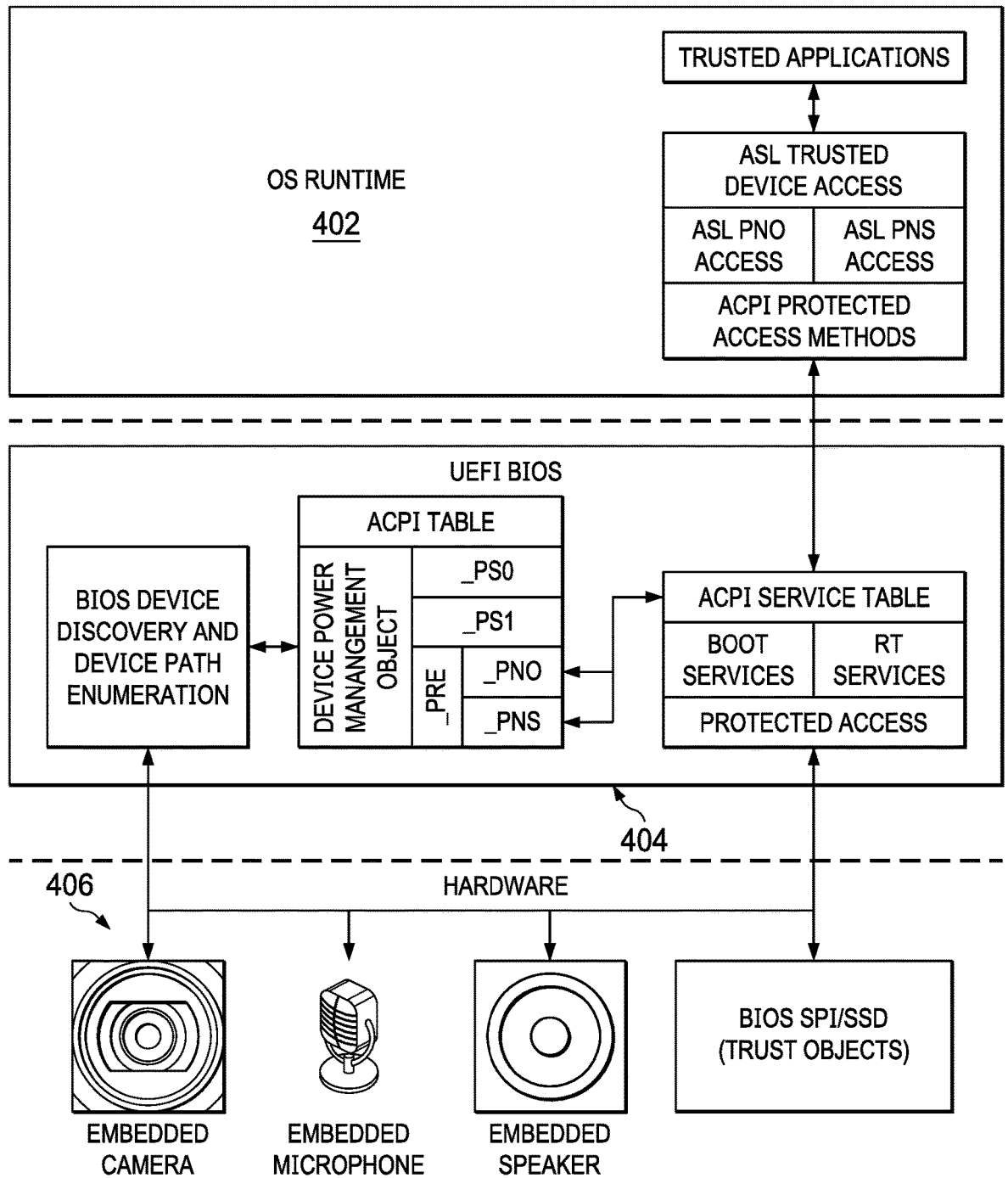
FIG. 4 illustrates a block diagram of an example information handling system, in accordance with embodiments of the present disclosure.

Turning now to FIG. 4, a block diagram is shown for an architecture according to embodiments of the present disclosure.

At a high level, UEFI BIOS 404 mediates requests from OS runtime 402 to access hardware 406.

In particular, as shown in FIG. 4, a new pre-boot ACPI method may support dynamic power node objects (_PNO) with power resource enumeration (_PRE) methods as an extended object of the ACPI device power management objects.

A new ACPI method for power node secure access (_PNS) with _PRE may also support runtime secure access and notify the user or administrator of an information handling system for purposes of acknowledging and enabling access to any sensitive information handling resources such as embedded devices.

In some embodiments, the embedded object information for each sensitive device may be created in a pre-boot environment (e.g., a UEFI BIOS) and stored in the ACPI namespace. For example, this information may be stored in the Differentiated System Description Table (DSDT), which contains the Differentiated Definition Block for each embedded object.

A boot service may implement the signing of data objects, and the signatures may be stored as part of the data object association in the _PNO. Upon invocation, the method may verify the signature. Only after such verification is the OS application allowed to enable the device object.

At OS runtime, an application may make a signed ACPI runtime call to retrieve a public key for embedded device objects, e.g., by using a UEFI signed variable. The OS runtime application may need to verify the public key, and so it may use a certificate stored in the OEM vendor specific application to verify the public key and call the _PNO method with a hash of the certificate and the public key for the data object.

The _PNO method may perform verification with its own data object, verify the hash of the certificate, and decrypt the data object using the public key that was passed from the OS runtime application. The _PNO method may thus verify that the OS application is authentic and change the embedded _PNO data object to an enabled state.

In some embodiments, a BIOS device discovery driver may detect the embedded device and enumerate the device path for the OS to use. The device power management objects discussed herein (e.g., _PNO) may implement new attributes such as power bus control bits. Accordingly, any embedded device may be dynamically enabled and/or disabled for use by the OS (or an application executing on the OS) at runtime based on secure access verification. In the absence of such verification, it may be impossible for the embedded device to power on.

The secure access verification may be implemented with a _PNS object, which may allow the _PNO to program the power bus control bits only after trust has been established with the application via the OS.

The _PNO and _PNS objects may operate at boot time in the same manner, such that the embedded device cannot be accessed at boot time (e.g., because none of the OS device discovery drivers can even detect the embedded device until the _PNO object enables the power bus discover bits).

Accordingly, vulnerabilities targeting embedded devices may be completely eliminated or rendered useless in accordance with embodiments of this disclosure.

Further, in some embodiments, the _PNS may enable the usage of an embedded device within a particular session. Once that session has expired, the device may be disabled. In order to enable the device again, the chain of trust may need to be reestablished, including another manual verification from the user of the system. The _PNS may also be used to implement such dynamic notifications to the user in order to require acknowledgment of the access request.

In some embodiments, the user acknowledgement may be implemented such that when the user opens an application (e.g., a webcam application), a pop-up may appear requesting a certificate or signature to allow an embedded device to power up. A session may then be created with that certificate.

Accordingly, embodiments of this disclosure may provide many benefits. Preventing unauthorized access to embedded devices within a system (e.g., a notebook or other portable computing system) may provide value for users. Unauthorized access to such embedded devices may be prevented via the use of ACPI dynamic power node enumerations to the OS. The ACPI _PNO and _PNS dynamic objects may control the power bus attributes of embedded devices such that any vulnerabilities that may be present cannot discover the embedded devices without establishing a chain of trust from the OS application. The embedded ACPI device objects may be dynamically controlled using OEM-specific authentication of embedded objects from an OEM OS application. Further, embodiments of this disclosure provide a method to share an OEM ACPI specific authentication signature method with the OEM OS application using a runtime signed variable, accessible only by the OEM OS application.

In some embodiments, a signed UEFI variable for enabling and/or disabling secure boot may be accessed by the OEM OS application. Such an OEM OS application may have the credentials to initiate the enabling and/or disabling, while other applications may not have such credentials.

In some embodiments, to enable or disable an embedded device object, the application may first need to read such a UEFI variable, which may give the authentication credentials to the application. Then the application may use that information, along with the hash of the resource path itself, to enumerate the ACPI power object resource path (e.g., by making an ACPI call to the embedded device object). This may be implemented as a one-way hash (the public certificate received from the UEFI variable, the embedded object, and the one-way hash value), and any ACPI call may be a privileged call.

In other embodiments, an OEM OS application may have access to the public certificate. Using the one-way hash to get and/or set the data of a UEFI variable may be triggered via a call to the embedded device object passing parameters such as the public certificate, the one-way hash of the data to get and/or set, and the variable that is to be accessed. Accordingly, only the OEM OS application may have the credentials to get the public certificate, which may be available only from a pre-authorized OEM OS application. Any other unauthorized application making a similar call will thus not be able to authorize the embedded device object. Using this method, the trust chain may be established via an ACPI/WMI call to the system, which knows each credential and is configured to exchange the credentials securely.

Although various possible advantages with respect to embodiments of this disclosure have been described, one of ordinary skill in the art with the benefit of this disclosure will understand that in any particular embodiment, not all of such advantages may be applicable. In any particular embodiment, some, all, or even none of the listed advantages may apply.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:
a processor;
a basic input/output system (BIOS) that is coupled to the processor and configured to execute a pre-boot environment prior to initialization of an operating system of the information handling system; and
an information handling resource coupled to the processor;
wherein the information handling system is configured to:
during execution of the pre-boot environment, create an Advanced Configuration and Power Interface (ACPI) power object for the information handling resource;
after initialization of the operating system, execute an application that is configured to request access to the ACPI power object; and
in response to cryptographic validation of the application, grant the application access to the ACPI power object, wherein granting the access includes allowing the application to cause the information handling resource to power on.

2. The information handling system of claim 1, wherein the BIOS is a Unified Extensible Firmware Interface (UEFI) BIOS.

3. The information handling system of claim 1, wherein the information handling resource is an embedded device of the information handling system.

4. The information handling system of claim 1, wherein the information handling resource includes a camera and/or a microphone.

5. The information handling system of claim 1, wherein the request for access to the ACPI power object includes a cryptographically signed runtime request to enable the information handling resource.

6. The information handling system of claim 5, wherein the cryptographic validation includes verifying a cryptographic signature of a vendor or manufacturer associated with the information handling system.

7. The information handling system of claim 1, wherein the application is granted access to the ACPI power object within a particular session.

8. The information handling system of claim 7, wherein, in response to expiration of the particular session, the information handling system is configured to power the information handling resource off.

9. A method comprising:
during execution of a pre-boot environment of an information handling system by a basic input/output system (BIOS) of the information handling system, creating an Advanced Configuration and Power Interface (ACPI) power object for an information handling resource of the information handling system;
after initialization of an operating system of the information handling system, executing an application that is configured to request access to the ACPI power object; and
in response to cryptographic validation of the application, granting the application access to the ACPI power object, wherein granting the access includes allowing the application to cause the information handling resource to power on.

10. The method of claim 9, wherein the information handling resource includes a camera.

11. The method of claim 9, further comprising granting the application access to the ACPI power object only within a particular session.

12. The method of claim 11, further comprising powering the information handling resource off in response to expiration of the particular session.

13. An article of manufacture comprising a non-transitory, computer-readable medium having computer-executable code thereon that is executable by a processor of an information handling system for:
during execution of a pre-boot environment of the information handling system by a basic input/output system (BIOS) of the information handling system, creating an Advanced Configuration and Power Interface (ACPI) power object for an information handling resource of the information handling system;
after initialization of an operating system of the information handling system, executing an application that is configured to request access to the ACPI power object; and
in response to cryptographic validation of the application, granting the application access to the ACPI power object, wherein granting the access includes allowing the application to cause the information handling resource to power on.

14. The article of claim 13, wherein the BIOS is a Unified Extensible Firmware Interface (UEFI) BIOS.

15. The article of claim 13, wherein the information handling resource is an embedded device of the information handling system.

16. The article of claim 13, wherein the information handling resource includes a camera and/or a microphone.

17. The article of claim 13, wherein the request for access to the ACPI power object includes a cryptographically signed runtime request to enable the information handling resource.

18. The article of claim 17, wherein the cryptographic validation includes verifying a cryptographic signature of a vendor or manufacturer associated with the information handling system.

19. The article of claim 13, wherein the application is granted access to the ACPI power object within a particular session.

20. The article of claim 19, wherein, in response to expiration of the particular session, the information handling system is configured to power the information handling resource off.

* * * * *